United States Patent [19]

Tomasch

[11] 4,157,777

[45] Jun. 12, 1979

[54] APPARATUS FOR ADVANCING AN ELONGATE ELEMENT

[75] Inventor: Wilhelm Tomasch, Halle, German Democratic Rep.

[73] Assignee: Zentralinstitut für Schweisstechnik der DDR, Halle, German Democratic Rep.

[21] Appl. No.: 838,357

[22] Filed: Sep. 30, 1977

[30] Foreign Application Priority Data

Sep. 30, 1976 [DD] German Democratic Rep. ... 195054

[51] Int. Cl.² ............................................. B65H 17/36
[52] U.S. Cl. .................................... 226/112; 226/115; 226/167
[58] Field of Search ................. 226/112, 115, 108–110, 226/167

[56] References Cited

U.S. PATENT DOCUMENTS

| | | | |
|---|---|---|---|
| 1,851,420 | 3/1932 | Carson | 226/108 |
| 2,891,661 | 6/1959 | Woods | 226/115 X |

*Primary Examiner*—Richard A. Schacher
*Attorney, Agent, or Firm*—Diller, Ramik & Wight

[57] ABSTRACT

For the purpose of advancing a rod, wire or the like, particularly a welding filler wire from a magazine to a welding site, the apparatus of the invention comprises at least two tappets, reciprocated by a rotary swash plate, the tappets being arranged with their axes parallel to the axis of the wire or the like and each carrying a transverse member defined by an engagement element and a clamping element between which the wire or the like is clamped when the member moves in one direction (whereby the wire or the like is advanced in that direction) whilst the member on the other tappet, moving in the opposite direction, slides over the wire or the like without the latter being clamped between the engagement element and the clamping element of that other member.

6 Claims, 1 Drawing Figure

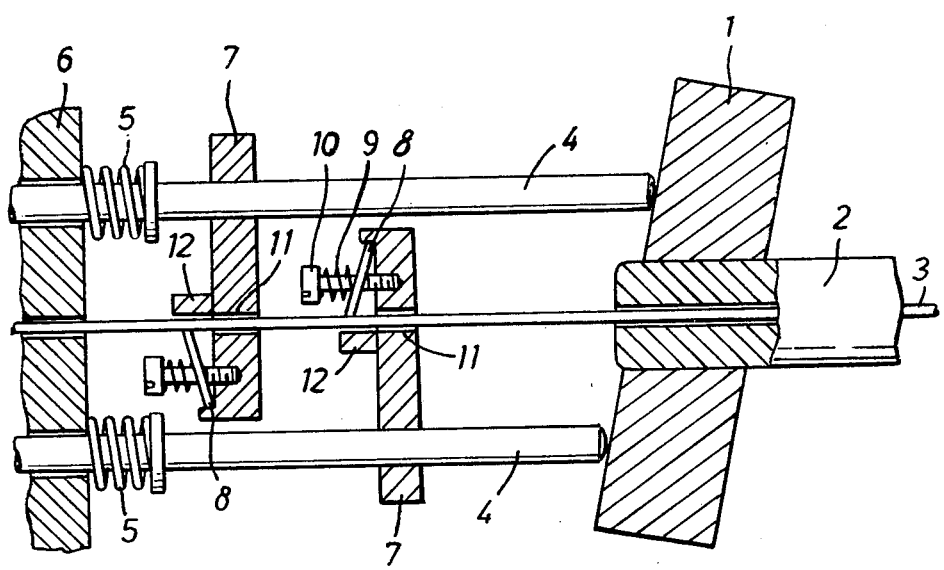

APPARATUS FOR ADVANCING AN ELONGATE ELEMENT

The invention relates to a wire feed drive, particularly for transporting welding filler wires of any kind from the magazine arragement to the welding site, as well as any other technologically determined axial transport of metallic and/or non-metallic bodies of rod- and wire shape.

CHARACTERISTIC OF THE KNOWN TECHNICAL SOLUTIONS

It is part of the common general knowledge in the art, that, in the course of arc welding, the electrode wires are fed by means of a wire feed drive which is equipped with reduction gears, e.g. spur-, planetary- or worm gears, the feeding being achieved by means of one or more wire feed rollers, which are pressed on to the electrode wire by means of a resilient or rigid pressure system in dependence on the wire diameter and the discharge force required. The wire feed rollers are driven by a controllable electric motor.

The disadvantages and drawbacks of such arc welding appliances reside firstly in the low efficiency of the weak feeding force if the electrode wire is to be fed without causing notching. Secondly the large weight of the gear box by reason of the large reduction gear ratio also has a disadvantageous effect. Moreover such appliances require an electric motor of high rating on account of the low efficiency of the system. Furthermore, owing to lack of portability and the large weight, assembly work at site is prejudiced.

From patent specification No. 99744 of the German Democratic Republic, a wire feed appliance is known in which a shaft, on which at least two feed rollers are so secured that, as the shaft rotates, the outer margins of the feed rollers describe arcs of circles, is driven by a drive element via a coupling. The outer margins of the feed rollers, which have sharp edges, engage the surface of the electrode wire on alternate sides and advance the latter by a predetermined length. The shaft is so constructed that the feed rollers are movably supported thereon oppositely, eccentrically and inclined to the shaft axis at a predetermined angle, whereby the engagement of the feed rollers on alternate sides in the surface of the wire, and the advancement of the latter are accomplished.

From patent specification No. 89770 of the German Democratic Republic, a device is known having rollers which press on the electrode wire and displace the latter, the roller having a hyperbolic contact surface and being rotatable about the non-rotatable electrode wire in a planetary manner, the axis of the different rollers including an angle with the axis of the electrode wire and, when in motion, describing a helical line, whereby the elctrode wire is advanced.

The disadvantages of the planetary drive with feed rollers which are obliquely disposed with respect to the wire axis reside in the large moment of inertia of the drive including the motor, which prevents rapid adjustment of the wire feed, which has an adverse effect particularly for spot welding and which, in other cases, may result in ignition difficulties.

The disadvantage which the above-described wire feed appliances, particularly the semi-automatic appliances, have in common is the size of the drives used, as a result of which such a torch becomes very heavy and cumbersome.

Furthermore an exceptionally simple principle of operation for the feeding of filler materials has been described in patent specification No. 623827 of the Federal German Republic, which is characterised in that the filler wire is guided between a clamping device arranged in the welding head transported to the welding site by means of a further clamping device, manually movable via a system of levers in the axis of the filler wire, after the frictional forces of the first clamping device have been overcome. This type of appliance is not suitable for application to modern automatic welding installations, since—by contrast with the feeding of rod-shaped electrodes—the compressive forces which must necessarily occur deform the filler materials which are to be used in the welding operation and thus render a continuous transport through the current nozzle impossible.

OBJECT OF THE INVENTION

It is therefore the object of the invention to create a wire feed drive, preferebly for transporting welding filler wires of any kind from the magazine arrangement to the welding site, as well as any other technologically determined axial transport of metallic and/or non-metallic bodies of rod- and wire shape, which does not limit the transportability of the body through devices downstream thereof, owing to deformations.

ESSENCE OF THE INVENTION

The purpose of the invention is to develop a wire feed arrangement in which the forces acting on the wire- or rod-shaped body generate a minimum of transverse forces in the cross-section of the material.

In accordance with the invention, this purpose is fulfilled by providing the drive shaft of a motor, preferably an electric motor in the case of wire feed drives for welding appliances, with a swash plate, which is engaged by two or more tappets. The tappets are provided with return springs, so that they cooperate with the swash plate in accordance with a sinusoidal-space-time diagram. Each of the tappets has secured thereto, and if desired exchangably, an engagement element having guide bores for the wire to be transported and having associated therewith a clamping element which has been prestressed by means of a compression spring. The clamping element abuts, on the one hand, against a plane of the engagement element which is disposed at right angles to the welding filler wire and, on the other hand, against the wire itself, an abutment support which is secured to the engagement element supporting the wire and thus securely preventing kinking. The consequence of the sinusoidal space-time movement in an axis disposed parallel to the wire to be fed and acting on the engagement element via the swash plate and the corresponding tappets is that, in the course of the stroke in the direction of feeding, the clamping element exerts a radial force on the wire, which however is incapable of causing deformation of the wire by reason of the abutment support, the frictional forces acting between the clamping elements and the wire forcing the wire to perform an axial movement, whereas the frictional forces become very small during the return stroke of the tappets owing to the obliquely disposed clamping element. Two or more engagement elements driven in this way and an appropriately high rotational velocity of the motor enable the invention to provide a high degree of continuity of the feed movement.

EXEMPLARY EMBODIMENT

The invention will now be explained with reference to an expemplary embodiment. The accompanying drawing shows the principle of construction of the wire feed drive.

The bored drive shaft 2 of a variable speed electric motor receives the swash plate 1 which has a hardened engagement surface and which drives two tappets 4 which have been hardened in like manner, which are slidingly received in tappet bearings 6 in the base member of the wire feed drive and which are guided against the engagement surface of the swash plate 1 by means of return springs 5. Each of the tappets 4 carries fixedly, and if desired exchangeably secured thereto an engagement element 7, which has a guide bore 11 for the welding filler wire 3 which is to be transported. The diameter of the bore exceeds the wire diameter by 0.2 to 0.3 mm. The engagement element moreover receives a clamping element 8, subjected to the action of a compression spring 9—preferably having a set screw 10—, the clamping element 8 consisting of a hardened steel disc or a carbide disc and being of such dimensions that it abuts, on the one hand, against the surface of the engagement element 7 which is disposed at right angles to the welding filler wire 3 and, on the other hand, against the welding filler wire 3, the latter being supported by an abutment support 12 provided on the engagement element 7.

With the swash plate 1 inclined at approximately 3 degrees and a diameter of the engagement track for the tappet 4 of approximately 28 mm, the latter are subjected to a stroke of nearly 1.4 mm and now advance the welding filler wire 3 by means of the engagement element 7 acting in the direction of feed of the welding filler wire 3 and provided with the engagement element 8, through approximately 2.8 mm per revolution of the motor, the clamping element 8 sliding ineffectively over the welding filler wire 3 during each return stroke of a tappet 4.

The manner of operation shows clearly that the wire feed arrangement is suitable for the axial displacement of any kind of body of rod- and wire shape.

I claim:

1. Apparatus for advancing successive portions of an elongate element along its axis, said apparatus comprising: a first and a second elongate tappet arranged with their axes substantially parallel to the axis of said element; a swash plate arranged for rotation about the axis of said element and for cooperation with said tappets so as to cause the latter to reciprocate in their respective axial directions when said swash plate is rotated during successive operating cycles of the apparatus, said tappets being biassed into contact with said swash plate and having a first and a second engagement element respectively extending transversely of the respective tappet axis; a first and a second clamping element associated respectively with said first and said second engagement element; first and second resilient means associated with, so as to bias, said first and said second clamping element respectively so as to cause the latter to abut on the one hand against a plane of its associated engagement element, said plane being substantially perpendicular to the axis of said elongate element and, on the other hand, against said elongate element; each said engagement element having an abutment portion for said elongate element and the arrangement being such that, upon continuous rotation of said swash plate and consequent cyclical reciprocation of said tappets, said first engagement element, during a first portion of each of said successive operating cycles, clamps said elongate element between it and its associated clamping element and advances it in a required direction whilst said second engagement element with its associated clamping element, without gripping the latter, rides over said elongate element in the opposite direction to a position whence, during a subsequent portion of said operating cycle, it advances said elongate element in said desired direction by holding it clamped between it and its associated clamping element.

2. Apparatus according to claim 1, wherein each said engagement element has a bore arranged for the passage therethrough of said elongate element.

3. Apparatus according to claim 1, wherein a bore is provided axially of said swash plate for the passage therethrough of said elongate element.

4. Apparatus according to claim 1, comprising a tappet bearing member adapted to provide a first bearing for said first tappet and a second bearing for said second tappet, said engagement elements being disposed between said bearing member and said swash plate and said bearing member having a bore for the passage therethrough of said elongate element.

5. Apparatus according to claim 1, wherein each said engagement element has adjustment means for adjusting the clamping force exertable on the said elongate element between said engagement element and its associated clamping element.

6. Apparatus according to claim 5, wherein said adjustment means are each defined by a set screw screwed into its associated engagement element and a compression spring on said set screw arranged to abut, so as to resiliently bias into engagement with said elongate element, the clamping element associated with said engagement element.

* * * * *